US007103650B1

(12) United States Patent
Vetrivelkumaran et al.

(10) Patent No.: US 7,103,650 B1
(45) Date of Patent: Sep. 5, 2006

(54) CLIENT COMPUTER CONFIGURATION BASED ON SERVER COMPUTER UPDATE

(75) Inventors: Vellore T. Vetrivelkumaran, Redmond, WA (US); Balaji Balasubramanyan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 683 days.

(21) Appl. No.: 09/669,819

(22) Filed: Sep. 26, 2000

(51) Int. Cl.
G06F 15/16 (2006.01)
G06F 15/173 (2006.01)
G06F 15/177 (2006.01)
G06F 9/44 (2006.01)

(52) U.S. Cl. .................. 709/221; 709/203; 709/223; 709/224; 709/248; 717/171

(58) Field of Classification Search ............ 709/202, 709/203, 220–224, 228, 230, 248; 713/1, 713/2, 100; 717/171
See application file for complete search history.

(56) References Cited

U.S. PATENT DOCUMENTS

| | | | | |
|---|---|---|---|---|
| 5,758,077 A | * | 5/1998 | Danahy et al. ............. 709/201 |
| 5,919,247 A | * | 7/1999 | Van Hoff et al. ........... 709/217 |
| 6,021,437 A | * | 2/2000 | Chen et al. ................ 709/224 |
| 6,032,198 A | * | 2/2000 | Fujii et al. ................ 719/328 |
| 6,094,679 A | * | 7/2000 | Teng et al. ................ 709/220 |
| 6,105,066 A | * | 8/2000 | Hayes, Jr. ................. 709/226 |
| 6,119,165 A | * | 9/2000 | Li et al. ................... 709/229 |
| 6,167,567 A | * | 12/2000 | Chiles et al. .............. 717/173 |
| 6,205,474 B1 | * | 3/2001 | Hurley ..................... 709/218 |
| 6,209,032 B1 | * | 3/2001 | Dutcher et al. ............ 709/223 |
| 6,282,709 B1 | * | 8/2001 | Reha et al. ................ 717/175 |
| 6,286,038 B1 | * | 9/2001 | Reichmeyer et al. ....... 709/220 |
| 6,289,378 B1 | * | 9/2001 | Meyer et al. .............. 709/223 |
| 6,314,565 B1 | * | 11/2001 | Kenner et al. ............. 717/171 |
| 6,324,693 B1 | * | 11/2001 | Brodersen et al. ......... 717/177 |
| 6,338,149 B1 | * | 1/2002 | Ciccone et al. ............ 714/38 |
| 6,397,245 B1 | * | 5/2002 | Johnson et al. ............ 709/203 |
| 6,430,576 B1 | * | 8/2002 | Gates et al. ............... 707/201 |
| 6,449,622 B1 | * | 9/2002 | LaRue et al. .............. 707/201 |
| 6,466,972 B1 | * | 10/2002 | Paul et al. ................. 709/222 |
| 6,480,901 B1 | * | 11/2002 | Weber et al. .............. 709/246 |
| 6,480,955 B1 | * | 11/2002 | DeKoning et al. ......... 713/100 |
| 6,487,590 B1 | * | 11/2002 | Foley et al. ............... 709/223 |
| 6,493,871 B1 | * | 12/2002 | McGuire et al. ........... 717/173 |
| 6,505,248 B1 | * | 1/2003 | Casper et al. ............. 709/224 |

(Continued)

*Primary Examiner*—Jason Cardone
*Assistant Examiner*—Melvin H. Pollack
(74) *Attorney, Agent, or Firm*—Microsoft Corporation

(57) ABSTRACT

The invention includes method and apparatus for updating a configuration of a client computer coupled by means of a network to a server computer. The updating process begins with a change in the status of a server computer. This change can be necessitated by addition of hardware such as an additional hard drive or the addition of an additional service such as shared Internet access. A status message is transmitted by means of the network between the server computer and the client computer regarding the changed status of the server computer. This message can be either an alert message from the server to all connected client computer nodes or can be accomplished by client polling for an updated status of the server. A message is displayed at the client computer to apprise a user that a status of the server computer has changed. Additionally, a communications between the client computer and the server computer takes place over the network to inform the client computer regarding details of the change of status in the server computer. This updated status allows a computer setup wizard running on the client computer to upgrade the status of the client.

21 Claims, 12 Drawing Sheets

U.S. PATENT DOCUMENTS

| | | | |
|---|---|---|---|
| 6,529,784 B1 * | 3/2003 | Cantos et al. | 700/79 |
| 6,578,142 B1 * | 6/2003 | Anderson et al. | 713/2 |
| 6,594,690 B1 * | 7/2003 | Cantwell | 709/217 |
| 6,614,804 B1 * | 9/2003 | McFadden et al. | 370/468 |
| 6,631,407 B1 * | 10/2003 | Mukaiyama et al. | 709/223 |
| 6,658,465 B1 * | 12/2003 | Touboul | 709/223 |
| 6,664,978 B1 * | 12/2003 | Kekic et al. | 345/733 |
| 6,697,969 B1 * | 2/2004 | Merriam | 714/46 |
| 6,725,262 B1 * | 4/2004 | Choquier et al. | 709/221 |
| 6,735,691 B1 * | 5/2004 | Capps et al. | 713/1 |
| 6,742,025 B1 * | 5/2004 | Jennery et al. | 709/220 |
| 6,745,241 B1 * | 6/2004 | French et al. | 709/221 |
| 6,785,706 B1 * | 8/2004 | Horman | 709/203 |
| 6,789,111 B1 * | 9/2004 | Brockway et al. | 709/222 |
| 6,868,092 B1 * | 3/2005 | Bell et al. | 370/503 |
| 6,892,230 B1 * | 5/2005 | Gu et al. | 709/220 |
| 6,922,722 B1 * | 7/2005 | Mann et al. | 709/220 |
| 6,925,497 B1 * | 8/2005 | Vetrivelkumaran et al. | 709/225 |
| 6,934,735 B1 * | 8/2005 | Emens et al. | 709/203 |
| 6,941,351 B1 * | 9/2005 | Vetrivelkumaran et al. | 709/217 |
| 6,941,355 B1 * | 9/2005 | Donaghey et al. | 709/220 |
| 6,961,762 B1 * | 11/2005 | Yeap et al. | 709/221 |
| 6,966,060 B1 * | 11/2005 | Young et al. | 717/177 |
| 6,976,062 B1 * | 12/2005 | Denby et al. | 709/220 |
| 2002/0069272 A1 * | 6/2002 | Kim et al. | 709/221 |
| 2002/0129128 A1 * | 9/2002 | Gold et al. | 709/220 |
| 2002/0133573 A1 * | 9/2002 | Matsuda et al. | 709/220 |
| 2003/0018755 A1 * | 1/2003 | Masterson et al. | 709/220 |
| 2003/0041136 A1 * | 2/2003 | Cheline et al. | 709/223 |
| 2005/0097225 A1 * | 5/2005 | Glatt et al. | 709/248 |

* cited by examiner

240

242

244

CLIENT COMPUTER CONFIGURATION BASED ON SERVER COMPUTER UPDATE

FIELD OF THE INVENTION

The present invention concerns computer networks and more particularly concerns automatic updating of computer client configurations in response to changes in the server computer configurations.

BACKGROUND ART

Local area computer networks, often referred to as LANs provide a popular means of interconnecting multiple computers so that they can communicate with each other. A simple network could be used to interconnect the personal computers in a small business. It would include a small number of computers (sometimes referred to as nodes) coupled together by means of network hardware to allow the computers to share files and peripherals such as printers, modems, scanners and the like. A network of this size can be simply run as a so called peer to peer network where all computers on the network are equal at least in terms of their relationship to each other on the network.

More sophisticated local area network configurations can increase the number of computers that are connected to a network and also can require different networking software. Certain of the computer nodes on such a network have special status on the network. These so called server computers (or servers) run software for managing network communications. Often a server computer or server node will have special peripherals such as faster modems or direct Internet connections. They may also have larger, faster access memories and larger, faster hard drives than the so called client nodes on the network. One example of server software that runs a local area network's server computers is Microsoft Windows NT Server.

Server components running on a server computer offer a number of services that can change depending on how the network administrator configures the network. Server computers are typically configured in a way to meet the network administrators perceived notion of what the client nodes on the network require. In the prior art, when a server configuration changed, the client nodes had to be changed and this was accomplished by a user accessing a configuration screen on the client and making software configuration changes for each of the client nodes on the network. Not all changes to a server software configuration need client side reconfiguration. In a small business network where relatively inexperienced administrators manage the network, it is difficult for the user to tell what updates to the server software require client nodes to be reconfigured and which of those server updates need no client reconfiguration.

More sophisticated networks have multiple servers coupled to different sets of client nodes. In a typical small business network of less than 50 computers coupled to the network there is only one server that services the needs of all client nodes. The present invention concerns efficient updating of network components including a means of updating the client software in response to a change of the status of a server computer.

SUMMARY OF THE INVENTION

Practice of the present invention provides a user of a computer network clearly understandable information on changes to a server node in the network. In one embodiment of the invention the user must initiate changes to the client computers corresponding to the changes to the server and in other configurations the changes are automatically implemented by software running in the client computers.

An exemplary embodiment of the invention updates a client computer coupled by means of a network to a server computer. The updating process begins with a change in the status of a server computer. This change can be necessitated by addition of hardware such as an additional hard drive or the addition of an additional service such as shared Internet access. A status message is transmitted by means of the network between the server computer and the client computer regarding the changed status of the server computer. This message can be either an alert message from the server to all connected client nodes or can be achieved by a polling of the server by the client computers for updated status of the server. A message is displayed at the client computer to apprise a user that a status of the server computer has changed. Additionally, a communications between the client computer and the server computer takes place over the network to inform the client computer regarding details of the change of status in the server computer.

In one exemplary embodiment of the invention a message is displayed on the client computer that a change has taken place in the server status and this message prompts the user to run a setup wizard that will upgrade the client computer status to correspond with the upgraded status of the server computer. An exemplary wizard performs a comparison of the client and server status and provides a checkbox control for updating the client. In an alternate embodiment the client is automatically updated to a configuration required by the updated server status and the user is merely apprised that an updated client status has been achieved.

These and other objects advantages and features of the invention will become better understood from the following detailed description of an exemplary embodiment of the invention which is described in conjunction with the accompanying drawings.

EXEMPLARY EMBODIMENT FOR PRACTICING THE INVENTION

Figure 1:
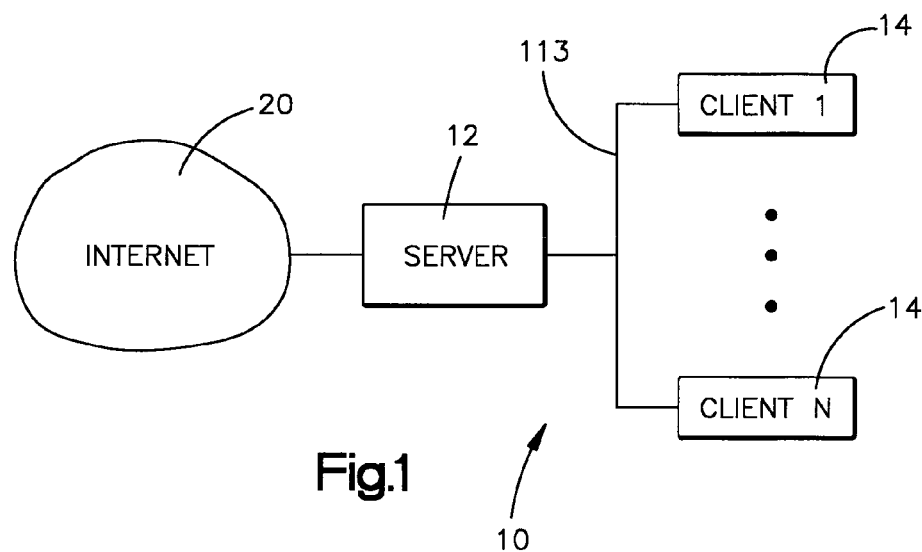
FIG. 1 is a schematic of a network of computers wherein one server computer is coupled to multiple client computers.

Turning now to the drawings, FIG. 1 is a schematic depiction of a computer network 10. The network 10 is shown as having a single server computer 12 and a number of client computers 14. In the following explanation it is assumed that the network 10 is a relatively small network (less than 50 computer nodes) and is often referred to as a local area network or LAN.

Figure 2:
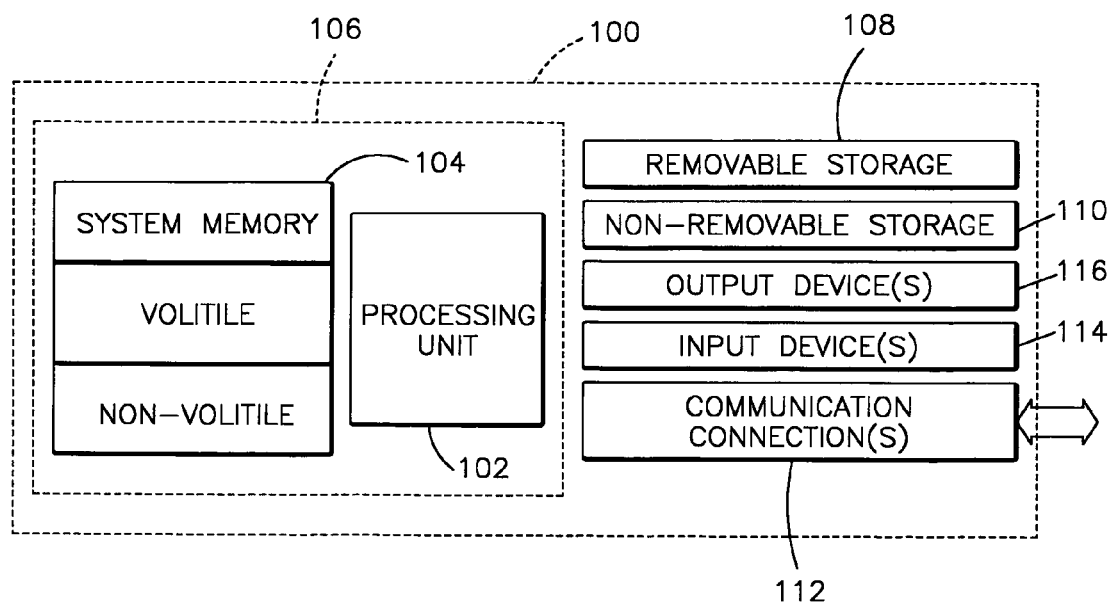
FIG. 2 is a schematic depiction of the components of a representative computing device coupled to the network shown in FIG. 1.

The network 10 includes a plurality of computing nodes each of which includes a computing device. One of the computing devices is a server computer and a number of other computing devices are client computers. Components of an exemplary computing device 100 are shown in FIG. 2. In its most basic configuration, the computing device 100 includes at least one processing unit 102 and memory 104. Depending on the exact configuration and type of computing device, the memory 104 may be volatile (such as RAM), non-volatile (such as ROM, flash memory, etc) or some combination of the two. This most basic configuration is illustrated as forming a module or component 106 of the FIG. 2 computing device.

Additionally the computing device 100 may also have additional features/functionality. For example, the computing device 100 may also include additional storage (removable and/or non-removable) including, but not limited to, magnetic or optical disks or tape. Such additional storage is illustrated in FIG. 1 by removable storage 108 and non-removable storage 110. The computer storage media includes volatile and non-volatile, removable and non-removable media implemented in any method or technology for storage of information such as computer readable instructions, data structures, program modules or other data. The memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 100.

In order to communicate over the network the computing device contains a communications connection 112 that allows the device 100 to communicate with other devices on the network 10 or as seen in FIG. 1 would allow the server 12 to communicate with other computers over the Internet 20. The communications connection 112 includes an interface to a communications media. A communications media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communications media includes the physical layer of the hardware for carrying signals on wire media such as a wired network or wireless media such as acoustic, RF, infrared and other wireless media. Network links 113 between computing devices in the FIG. 1 network depiction are implemented using some or all of the aforementioned communications media. The term computer readable media as used in the present description includes both storage media and communications media.

The computing device 100 may also have input devices(s) 114 such as a keyboard, mouse, pen, voice input device, touch input device, etc. Output devices 116 such as a display, speakers, printers, etc may also be included. All these devices are well known in the art and need not be discussed at length herein. It is noted that the server 12 in FIG. 1 may be configured without a video display or keyboard input. In such a circumstance control functions and setup on the server 12 are performed by an interface to the server 12 available through one of the client computers. When the network 10 is initially set up, special server software is installed on the server computer 12 and other networking software is installed on the client computers 14. Alternatively, the server computer may be delivered from a vendor with all software installed and may only need to be configured. Such a computer is referred herein as a server appliance to be contrasted from a computer that is merely configured to act as a server due to the installation of software for performing server functions.

The server software provides a variety of features or functions that may or may not be required by a network administrator responsible for maintaining the network 10. As an example, when the network is first installed, Internet access may not be made available to the client computers by means of the network 10. As the user's needs and sophistication grow the server software can be reconfigured to provide additional network functionality.

The present invention provides a means of updating a client computer 14 in the event the server 12 is reconfigured. The process is initiated in response to a user, typically the network administrator changing a status or reconfiguring the server computer 12. When a reconfiguration takes place a status message is sent by means of the network between the server computer and the client computer regarding the change of status of the server computer 12. A message is displayed at the client computer on a display coupled to the client to apprise a user that a status of the server computer has changed. Further communications between the client computer 14 and the server computer 12 takes place over the network 10 to inform the client computer 14 regarding details of the change of status in the server computer 12. In the exemplary embodiment of the invention the client and server are running a Windows® operating system developed by Microsoft Corporation.

Figure 3:
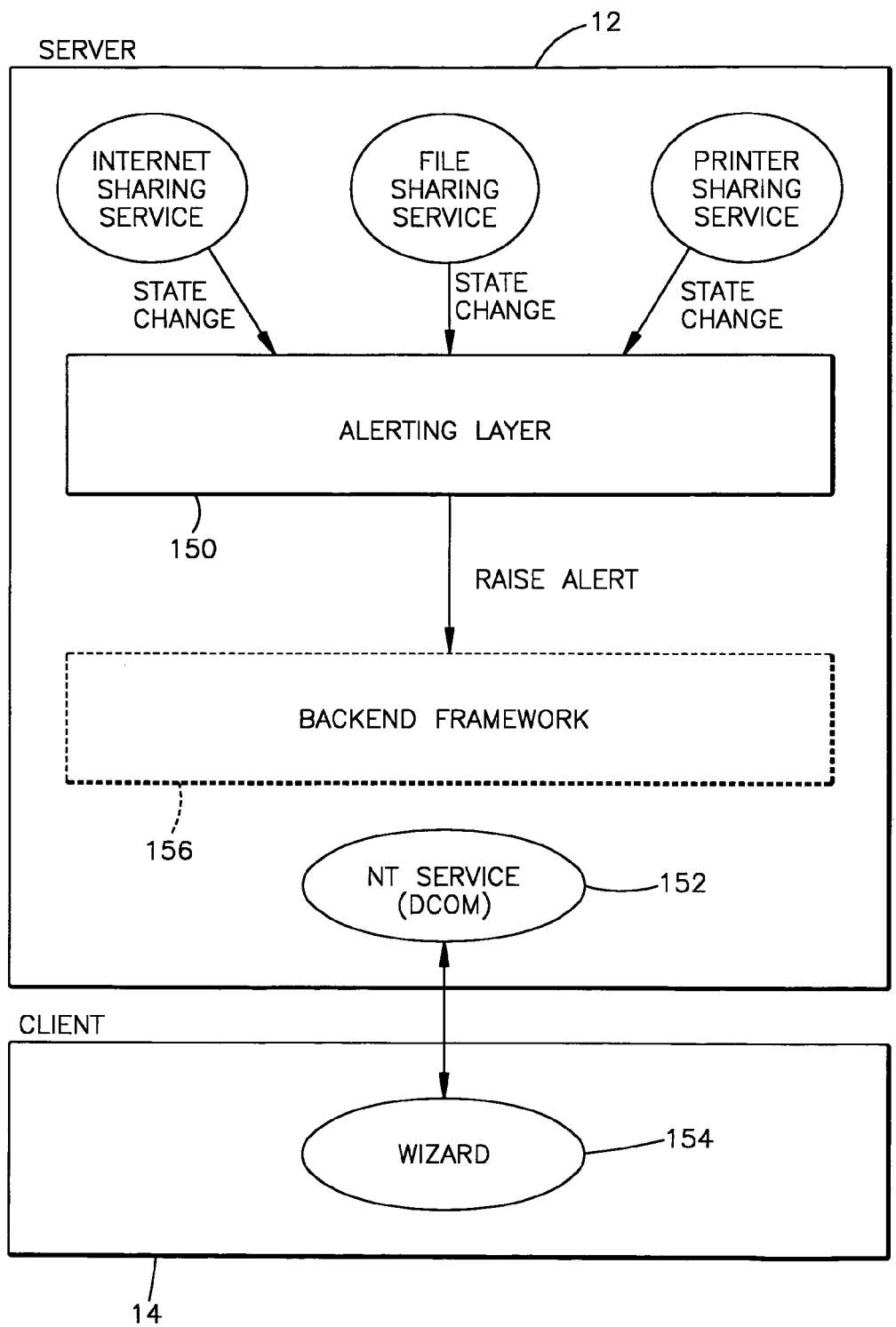
FIG. 3 is a block diagram showing client and server software components used in practice of the exemplary embodiment of the invention.

The exemplary embodiment of the invention is implemented using three software components shown in FIG. 3: an alerting layer 150, an NT Service 152 and a client side Win32 wizard 154. The alerting layer provides a uniform mechanism for the NT Service 152 to indicate if a server state change or reconfiguration requires a client computer reconfiguration. The NT service 152 also provides a mechanism by which the client can query the server for specific state changes and the client side wizard 154 provides the user with a easy to use interface for updating the client configuration to match the server that has been reconfigured.

Alerting Layer:

A back end framework component 156 on the server provides a mechanism to alert the user to abnormal conditions in the system. These conditions are reflected in an administration web page (FIG. 7) that a user sees when viewing the server settings from a browser running on a remote client computer 14. The invention provides a layer on top of this back end framework 156, the Alerting Layer 150, that is used by the individual services to inform a user that a change of state has occurred on the server 12 that requires the client computers on the network 10 to be reconfigured. The Alerting Layer 150 guarantees that only one such alert is displayed to the network clients at all times (this means that if more than one service needs the client to be reconfigured, the user on the client will still see only one message about the need to reconfigure the client).

A user pointing a browser at the server sees this generic message and can respond by launching a client side wizard 154 to configure that client appropriately. This wizard 154 is run on each client in the network in order to get the clients on the network in sync with the server settings.

NT Service

The NT Service 152 is responsible for telling the client what are the exact changes that have occurred to the server. Note that the message sent to the client discussed above is generic and only tells the user that something has changed on the server. The NT service also responds to client requests to tell the client exactly what has changed on the server 12.

This NT Service is a DCOM server with security settings allowing everyone to access it from any client computer 14 having a DCOM client interface software component. This allows any client on the network to talk to this NT service 152 and find out the state of the server. Note that since this service provides a read only interface to the server, it is not a breach of security to allow anyone on the network to talk to this DCOM server component.

Client Side Wizard:

The client side wizard 154 is a software component running on the client and provides an easy to use user interface on the client to efficiently allow the user to understand what settings need to be updated on the client computer 14. This wizard 154 gets the current server settings from the DCOM server (NT service mentioned above), compares the server settings thus obtained with the current client settings and then presents the user with a change list which indicates which of the services on the client need to be reconfigured. The user has the option to override the changes suggested by the client at this point. Once the user has decided on the options, this wizard 154 takes care of actually updating the client to work with the server.

Software Installation

Each of the client and server computers shown in FIG. 1 is a computing device similar to the computing device 100 described above in relation to FIG. 2. The network server 12 comes from a supplier with software already installed in a default configuration. In the event this is a server appliance for managing the network, there is no video display nor is there a keyboard or mouse input and the means of re-configuring the server.

Figure 5:
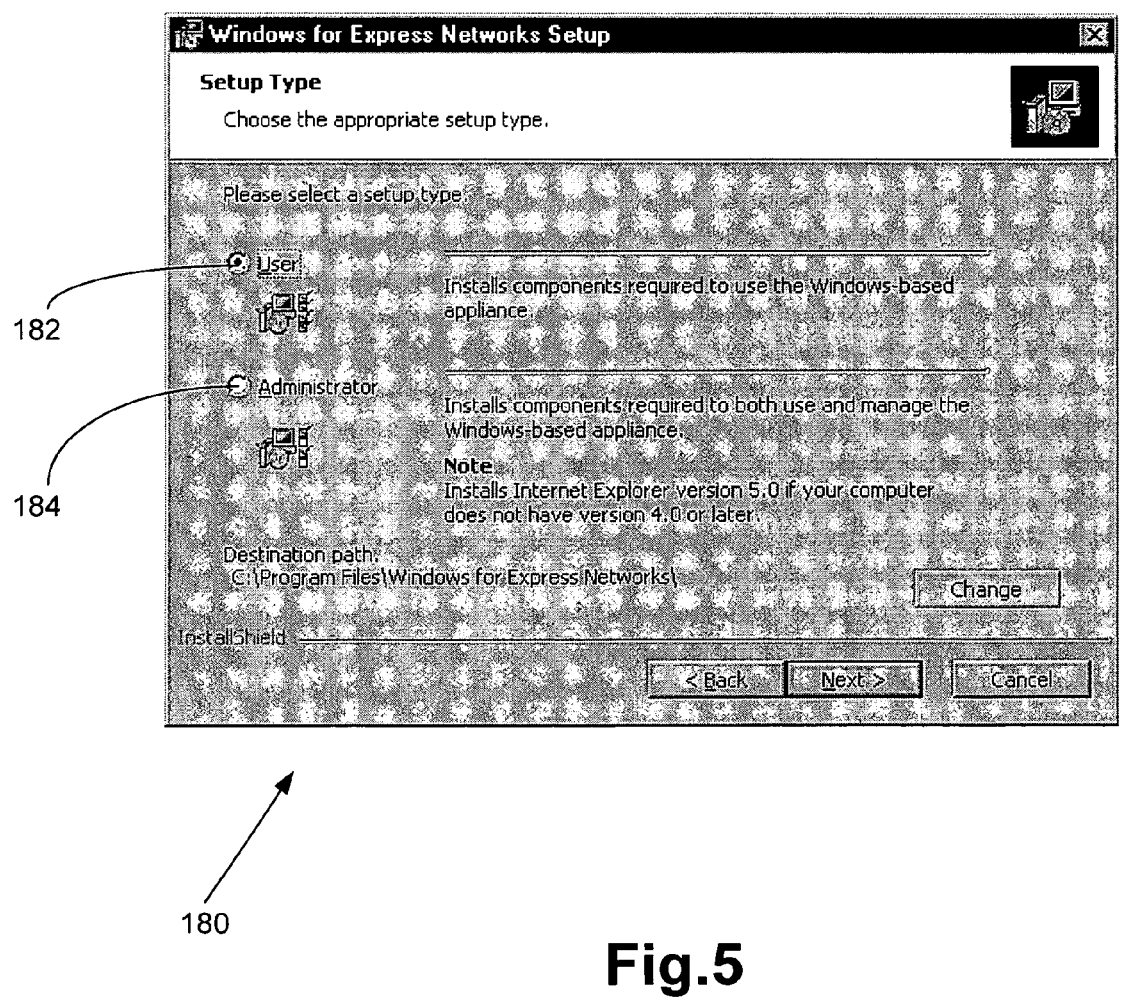
FIG. 5 is a user interface for choosing a user status during installation of networking software used in conjunction with the present invention.

Networking software for the client computers 14 is installed in accordance with an installation process performed by installation software read from a storage medium such as a floppy disk or CDROM. A network interface card is installed and set up in accordance with a software installer component shipped with the interface card by the interface card supplier. A network setup wizard performs steps of detecting a working network card, then setting up needed networking components (such as TCP/IP or other protocols) and possibly rebooting the computer. The networking wizard installs and registers client side components, may upgrade the computer browser softare, and may install DCOM components. During the installation process a user interface 180 that is depicted in FIG. 5 prompts the user to input a choice of managing the network computing device 100 as either an administrator or a user.

For non-administrator users, a computer setup wizard prompts the user on how to set up shared disk files with the server over the network. Other prompts from the setup wizard help users install a printer, achieve a shared Internet connection and enable security if the server is currently configured to offer such services.

Server Reconfiguration

The same comuter setup wizard that guides the user during the installation process helps the user respond to reconfiguration messages sent by the server 12 due to server reconfiguration performed as server services are updated or changed by a network administrator. Subsequent to a server reconfiguration, the next time a client computer points to the server in a browser address window, an information message will be displayed in a message list on a user interface status tab 200. The alerting layer 150 will raise an alert to inform the user that configuration changes to the server necessitate a change to the configuration of the client computers. In an alternative embodiment of the invention the alert is broadcast to all client computers 14 coupled to the network 10 and a popup message will be displayed to cause the client user to be aware that the client has been reconfigured.

Figure 4:
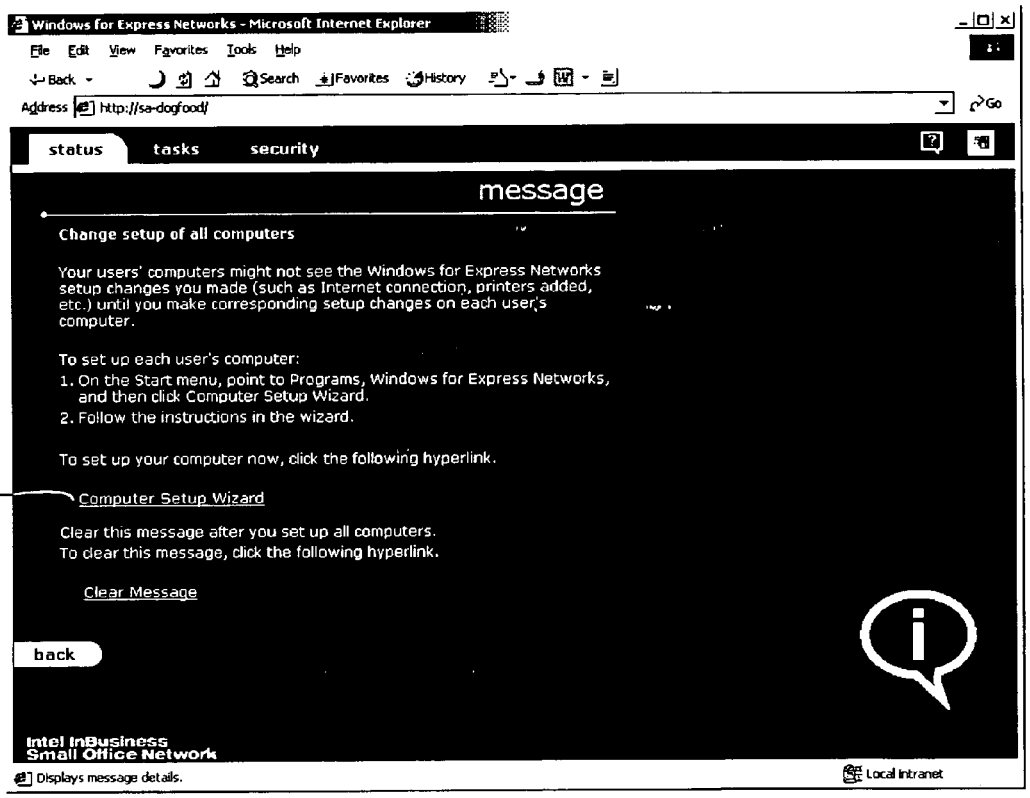
FIG. 4 is a user interface that includes a link for launching a computer setup wizard.
Figure 6:
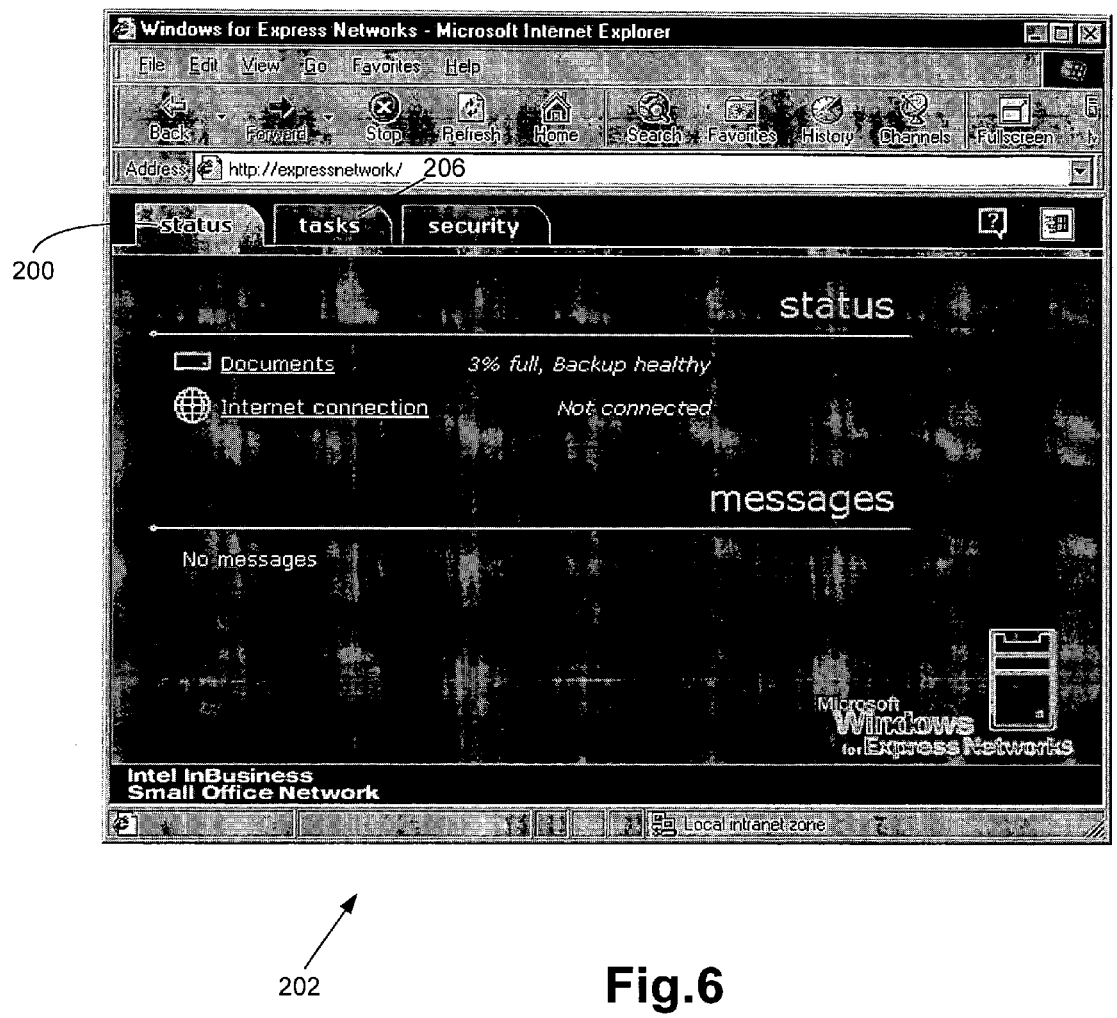
FIGS. 6 and 7 are message conveying user interfaces for use in conjunction with the present invention.
Figure 7:
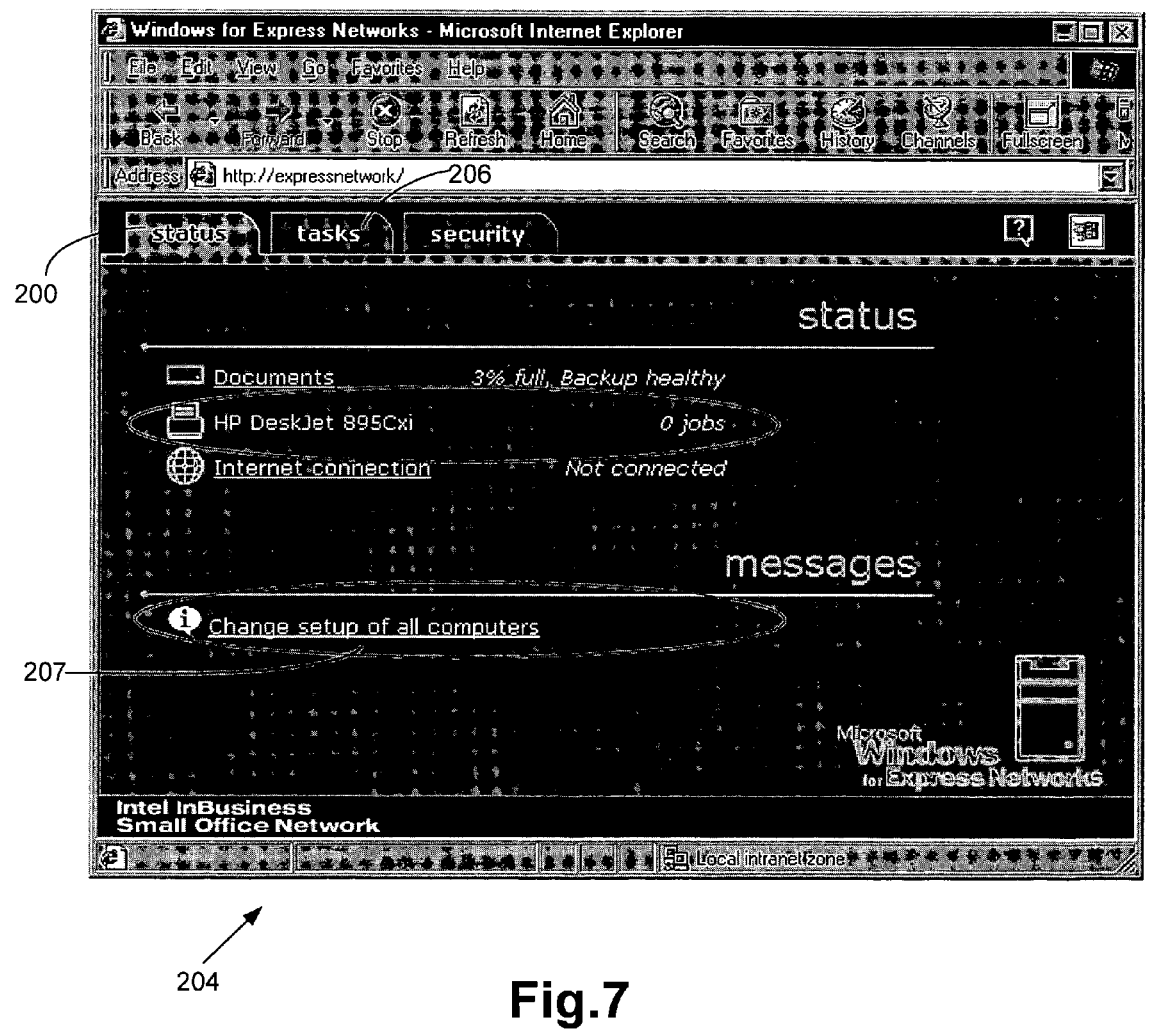

FIGS. 6 and 7 are before and after pages 202, 204 displayed by the browser showing the format of the information message sent to the client computers by the server 12, to prompt the user in re-configuring a client computer 14. In the example depicted in FIG. 7, the server has raised an alert that informs a user that the server configuration has changed. The message presented to the user is generic and when the user sees the information shown in FIG. 7, he or she has no way to know that the change has been caused by an addition of a printer. That information is revealed when the user clicks on a "Change setup of all computers" link 207. Each client computer will receive a similar message asking that the user reconfigure the client software to match the reconfigured server. The users will be able to configure the client components by clicking on the link 207. Clicking on the link 207 launches a descriptive page 210 (FIG. 4) which allows the user to launch the computer set up wizard by clicking a link 212. The page 210 also contains instructions for launching the set-up wizard at other user computers on the network 10. In a Windows® environment the user may alternatively reconfigure the client computer by running the computer setup wizard by pointing to the "Start" menu and clicking on an appropriate menu item. The computer set up wizard is loaded and executed to prompt a user on how to reconfigure the network settings on the client computers attached to the network.

FIG. 7 depicts a specific instance of a client computer receiving a generic alert message. Alerts are also sent to the clients when a printer is removed from the network, an internet connection is configured, security is enabled, or security is disabled. Each computer display will receive a message indicating that the network setup has changed and the user must make corresponding client computer changes include those clients that have been assigned server configuration privileges.

Figure 8:
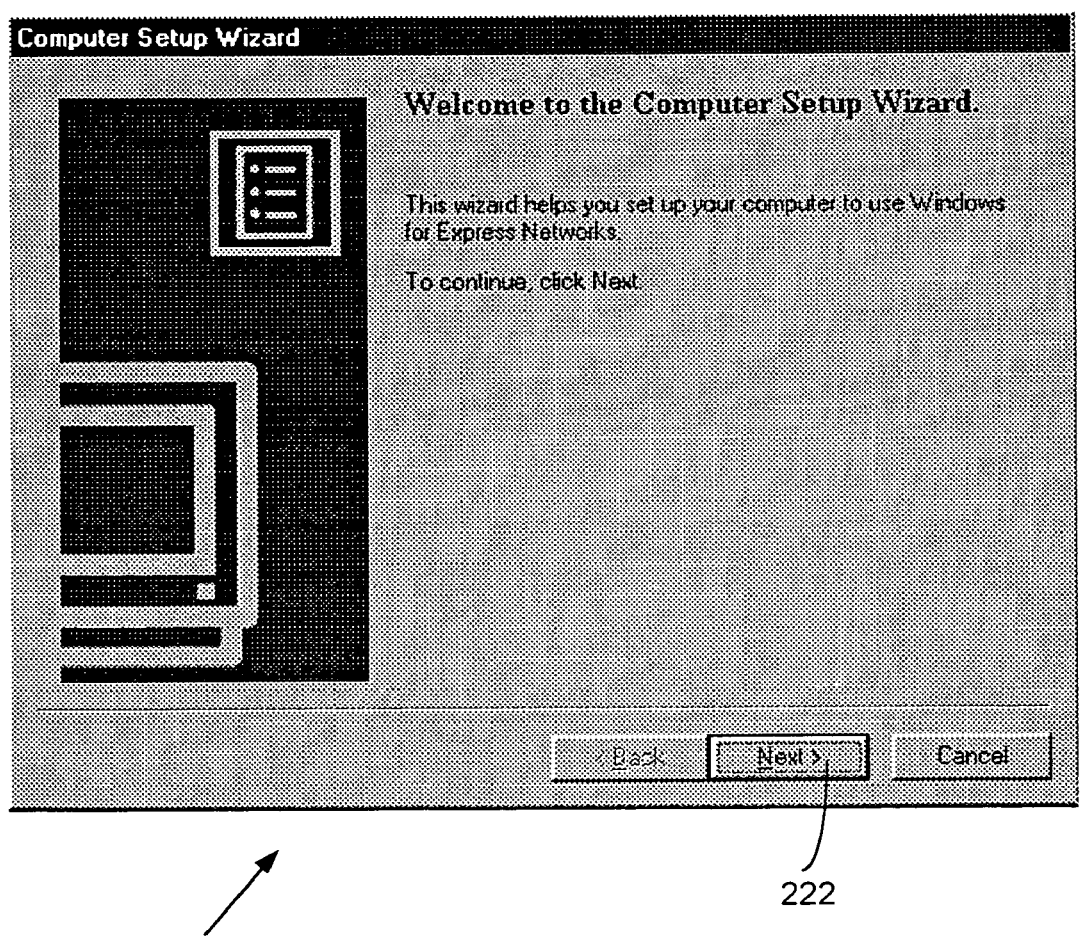
FIGS. 8–12 are representative user interface screens that guide a user through a process of updating or reconfiguring a client computer using a computer setup wizard.
Figure 9:
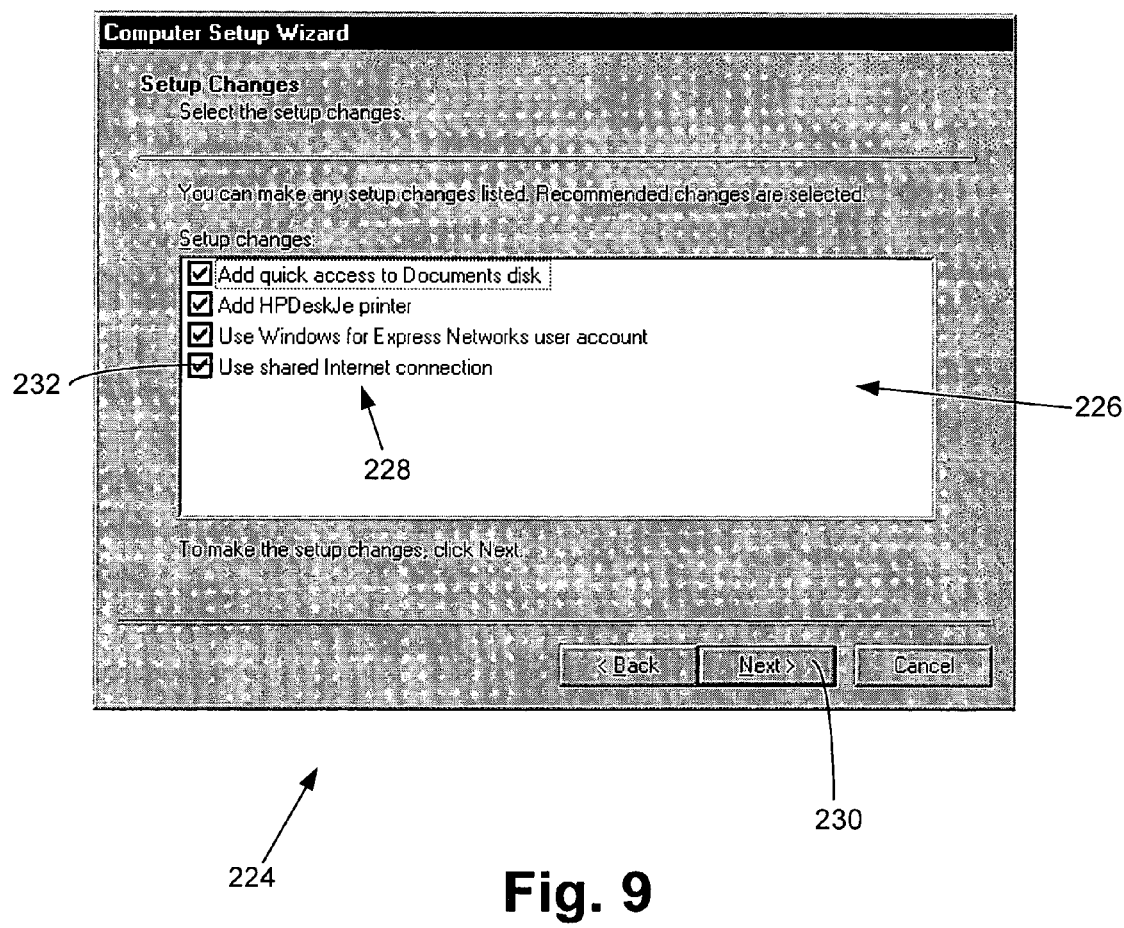

FIG. 8 is a first interface page 220 presented to the user when the computer setup wizard is launched. A 'next' button 222 is activated to move to the second interface page 224 depicted in FIG. 9. This interface includes a text window or memo box 226 showing a list 228 of possible set up changes the user is requested to approve. The list includes four check boxes that have been selected or unselected depending upon the sensed condition of the reconfigured server computer 12. By clicking on a next button 230 the user can accept the recommended settings based upon communications between the client computer 14 that is being reconfigured and the setting of the server that were communicated to the client from the server in response to a request for such information.

Figure 10:
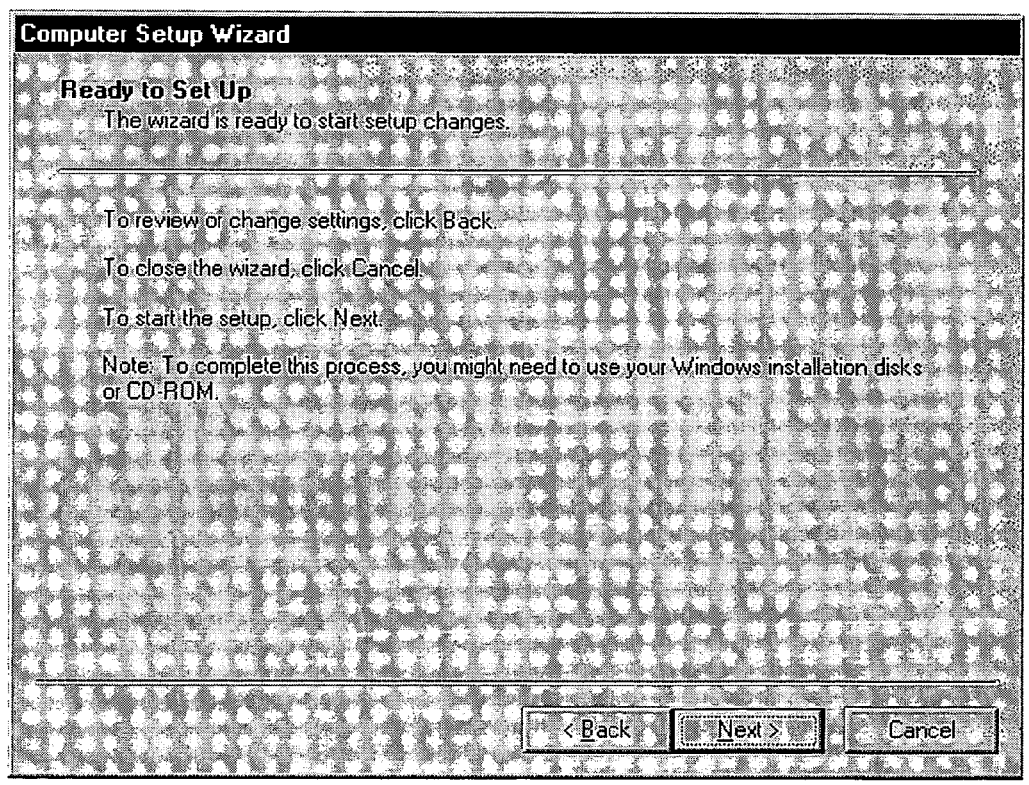
Figure 11:
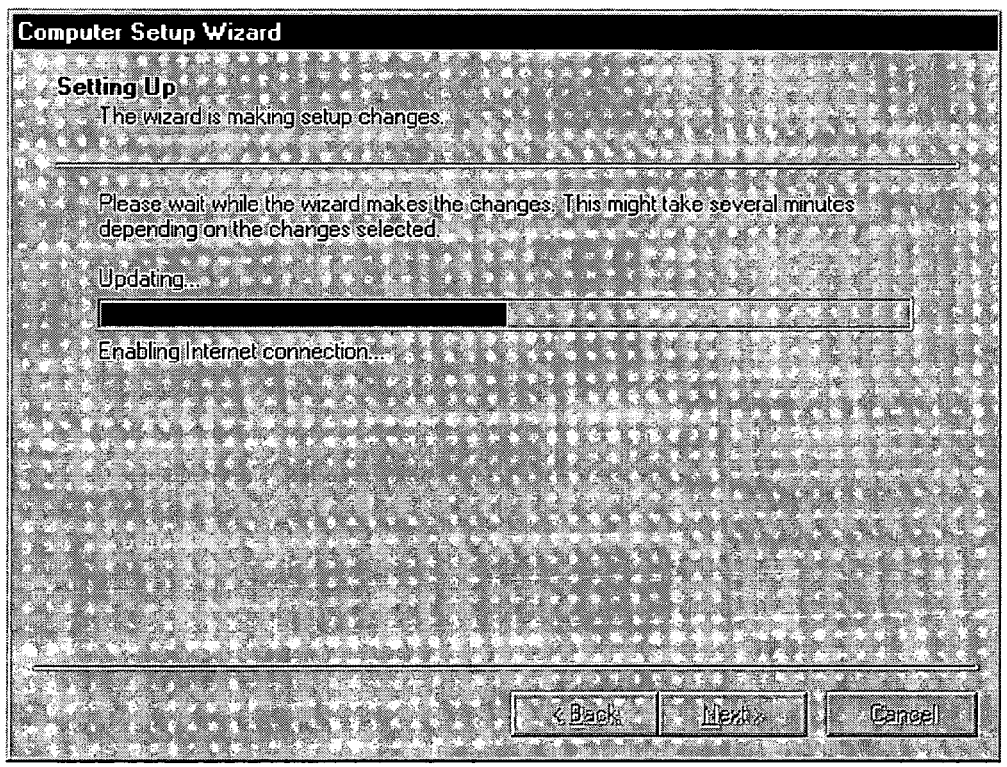
Figure 12:
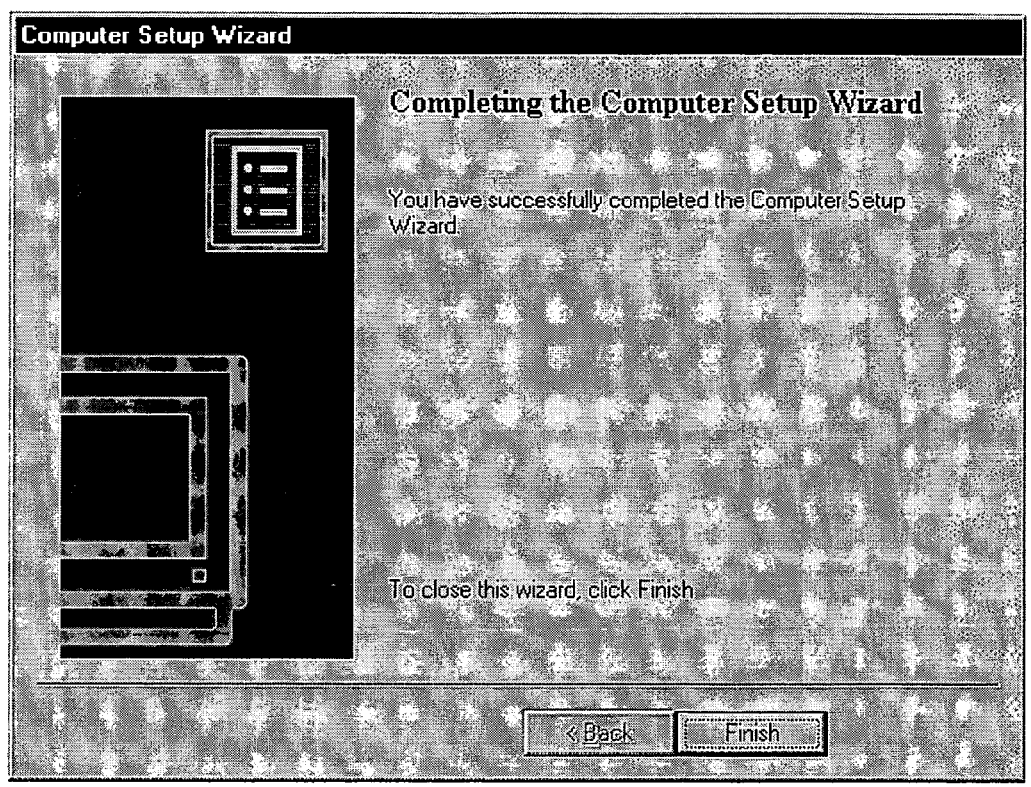

Three additional user interface pages 240, 242, 244 are displayed to the user by the computer setup wizard and are depicted in FIGS. 10–12. The first page 240 gives the user an opportunity to confirm that he or she wishes to reconfigure the client computer. The next page 242 allows the user to monitor progress of the client reconfiguration and a page 244 displays a message that the reconfiguration was successful. If it was not successful a different message with instruction on how to attempt a reconfiguration is presented on the client computer display.

Figure 13:
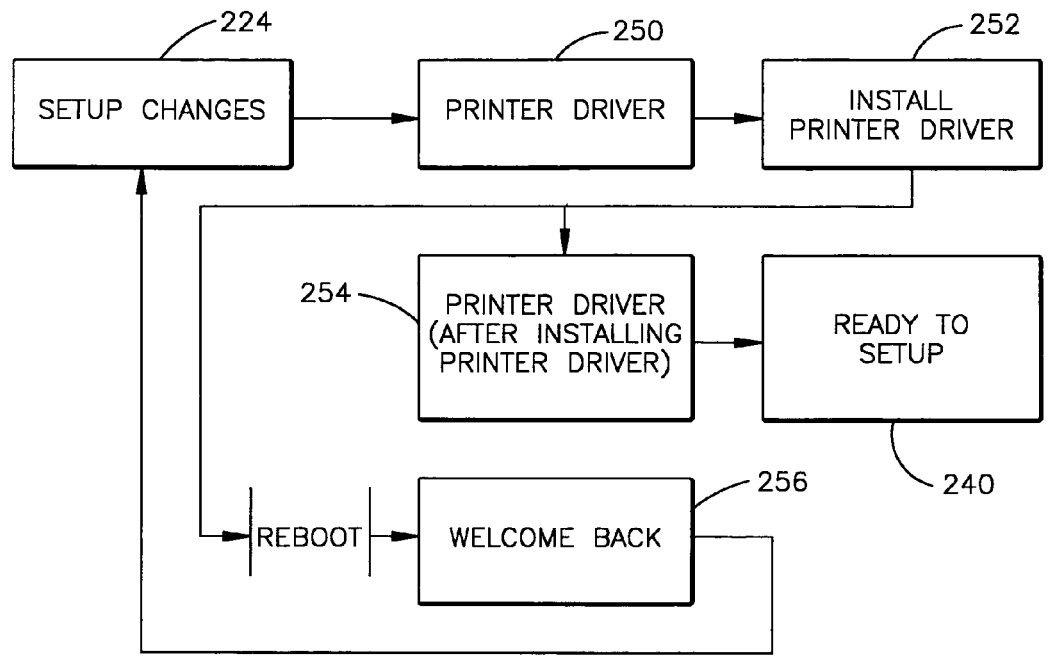
FIGS. 13–15 schematically indicate a sequence of user interface pages displayed during a client configuration update process.
Figure 14:
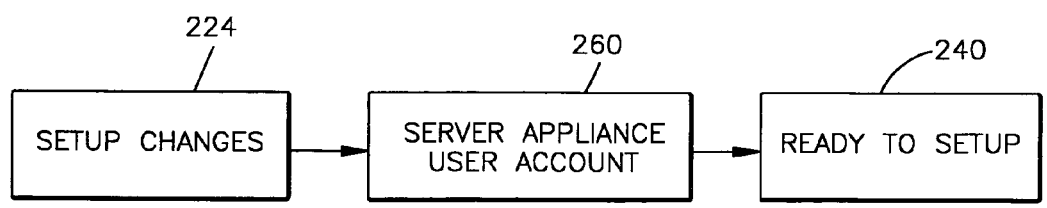
Figure 15:
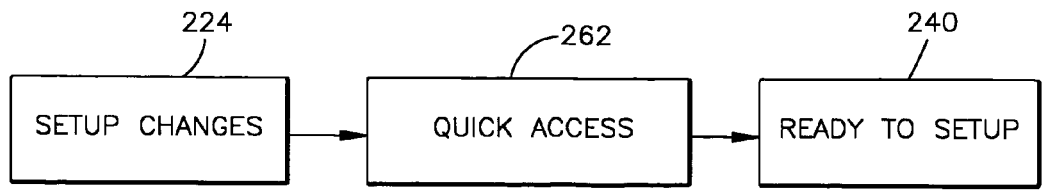

FIGS. 13–15 schematically depict other pages intermediate the setup changes page 224 and the ready to setup page 240 that are displayed by the computer setup wizard. The depiction of FIG. 13 illustrates additional user interface pages 250, 252, 254, 256 needed to guide a user through an installation of a printer that has been added to the network server 12. In a printer driver page 250 options regarding a printer driver for a new printer are made available for selection by a user. If a driver is installed the user will be prompted to allow a reboot of the computer.

FIG. 14 is a depiction of a page 260 displayed by the wizard to depict a network security feature to password protect access to server resources from the client computers 14. A client setup change that configures the client to use a server appliance user account has one component setup page 260. The user is prompted for a user name in order to enable the server to determine if a user account exists for that user before installing a security component in the client computer 14.

FIG. 15 illustrates a setup page 262 for enabling sharing of a hard disk on the server by the client computer 14. The page 262 presents a user options for mapping a shared disk drive available from the server computer 12 onto the client computer 14. The shared drive is mapped as a designated drive on the client 14 and an option is made available to the user to added a shortcut to the drive that has been shared on the client desktop.

Internet Access Example

Consider an example of a small business network 10 having a server 12 on which internet sharing has just been enabled by a user having administrator privileges. When internet sharing is enabled on the server, Winsock proxy client side bits must be installed on each client computer 14. Since the Windows operating system on the server involves enabling both the Winsock proxy and the web proxy on the server, this step also requires a configuring of the server 12 to be the web proxy for the browser on the client computer 14.

The steps of reconfiguring to achieve shared Internet access are outlined below. First an administrator user must enable internet sharing on the server 12. To do this the user runs an Internet Configuration Wizard on a browser running on a remote client computer 14. This causes the Internet sharing service on the server 12 to enable itself. The Internet Sharing service on the server in turn enables the web proxy and the Winsock proxy on the server. An Internet sharing service on the server 12 then uses the alerting layer 150 to raise an alert telling the clients on the network 10 that they need to reconfigure themselves. The backend framework 156 takes this information and shows it as an alert message on the server management page of any client computers having administrator status. Normal users on other clients see this as an alert message on the status page of their browser, allowing the user to run the client side computer setup wizard 185. This wizard contacts the DCOM server 152 on the server 12 to find out which services are enabled/disabled on the server 12. The server returns this list to the client 14. The wizard then checks the state of the client. From this comparison it is determined that Internet Sharing is enabled on the server but not on the client. This is brought to the Users attention by adding a check mark to the check box 232 depicted in the user interface page 224 shown in FIG. 9. If the user allows this change by clicking on the next box 230, the wizard 185 configures the client to use Winsock proxy client and sets the web proxy for the browser on the client to be the server 12.

The examples discussed have all depended on a user launching a computer setup wizard but it is certainly possible that software modifications could be made using the DCOM components in the server and clients to automatically reconfigure the clients. Such an option could prompt the user when the update occurs that such an update has occurred or could prompt the user to confirm that such an update is desired. As an alternative, the client computer 14 could be configured to poll the server computer 14 for any updates in status each time the client is rebooted or each time a user signs onto the client.

While the disclosed exemplary embodiment of the invention has been described with a degree of particularity, it is the intent that the invention include all alterations and modifications from the disclosed design falling within the spirit or scope of the appended claims.

What is claimed is:

1. A method for enabling updating of client computers coupleable by a network to a server computer, the method comprising:
    at the server computer, automatically identifying a configuration change of the server computer;
    automatically identifying at least one client configuration change that is called for, by the configuration change of the server computer, for the client computers to interoperate with the server computer as reconfigured according to the configuration change of the server computer; and
    transmitting a status message to a client computer, the status message including an indication that a client configuration change is called for, where the message is capable of being interacted with by a user of the client computer to control whether or not to apply the one client configuration change on the client computer.

2. The method of claim 1, further comprising:
    determining if the identified at least one client configuration change is required to be made at the client computers; and
    transmitting the status message only if the identified at least one client configuration change is required to be made at the client computers.

3. The method of claim 1 wherein the transmitting a status message further comprises transmitting the status message to the client computer in response to periodic polling of the server's configuration status by the client computer.

4. The method of claim 1 wherein the transmitting the status message further comprises broadcasting the status message to the client computers.

5. The method of claim 1 wherein the status message further comprises a list of updated server computer status.

6. The method of claim 1, further comprising causing a message to be displayed at the client computer, the message identifying each client configuration change to be made to the client computer based on the configuration change of the server computer.

7. A server apparatus for enabling updating of one or more client computers coupleable to the server via a computer network, the server computer including at least one processor for executing a stored program within a server computer memory, said stored program comprising:

a status update component to allow a user to change a configuration of the server computer and to, in response to the change of the configuration of the server computer, automatically identify one or more client configuration changes that, if applied on a client computer, will enable the client computer to interoperate with the server computer in accordance with the changed configuration of the server computer;

a communications component for transmitting a status message via the network to the one or more client computers regarding the change of the configuration of the server computer to apprise users of the client computers that the configuration of the server computer has changed; and a status component for exposing a detailed listing of the changed configuration of said server to the one or more client configuration changes, where the listing is provided to the one or more clients responsive to a request from the one or more clients actuated using the status message, where the detailed listing is configured to be used by a wizard on the one or more clients to allow users to interactively control whether to apply updates on the one or more client computers that correspond to the listing.

8. The apparatus of claim 7 wherein the communications component is a DCOM server component having an interface exposed to a DCOM client residing on the one or more client computers.

9. One or more computer-readable media containing executable instructions that, when executed, implement the following method comprising:

at a server, automatically identifying a configuration change of the server computer;

automatically identifying a client configuration change that is called for in one or more client computers connected to the server computer via a network, said client configuration change being necessitated by the change in configuration of the server computer so that the client computers can interoperate with the server computer as reconfigured according to the configuration change of the server computer; and transmitting a status message to the one or more client computers regarding the client configuration change, where the message is capable of being interacted with by a user of the client computer to control whether or not to apply the client configuration change on the client computer.

10. The one or more computer-readable media as recited in claim 9, wherein the transmitting a status message to the one or more client computers further comprises transmitting the status message to at least one of the one or more client computers in response to polling of the server status by the at least one client computer.

11. The one or more computer-readable media as recited in claim 9, the method further comprising transmitting a user actuatable control to at least one of the one or more client computers that allows a client user to effect the client configuration change.

12. The one or more computer-readable media as recited in claim 9, further comprising automatically effecting the client configuration change in at least one of the one or more client computers.

13. The one or more computer-readable media as recited in claim 12, further comprising transmitting a message to the client computer indicating that the client configuration change has been made.

14. A method for updating a configuration of a client computer in response to a reconfiguration of a network server computer, the method comprising:

receiving a notification from the server computer that at least one of multiple server configuration settings has been updated, the server configuration settings comprising settings that affect how client computers interoperate with the server computer;

determining an updated status of the multiple server configuration settings;

displaying a list of interactively selectable client reconfiguration choices corresponding to the updated server status of the multiple server configuration settings, where the reconfiguration choices correspond to configuration changes on the client that affect interoperability with the sever according to its updated settings;

receiving user input to accept or modify the list of client reconfiguration choices; and displaying a command button which, when actuated, causes a reconfiguring of the client computer based upon the list of client reconfiguration choices.

15. The method of claim 14 wherein the displaying a list of client reconfiguration choices further comprises displaying a list of checkboxes which allow the user to select desired client reconfiguration choices from the list of client reconfiguration choices.

16. The method of claim 15 wherein the checkboxes have an initial state of being either checked or unchecked based on a sensed configuration of the server computer.

17. The method of claim 15 wherein at least one checkbox relates to a disk drive configuration on the client for sharing access to a disk drive on the network.

18. The method of claim 15 where at least one checkbox relates to adding shared Internet access through a server connection to the Internet by means of communications with the server over a network.

19. The method of claim 15 wherein at least one checkbox relates to adding secure access to services of the server from the client computer by means of network password protection.

20. The method of claim 15 wherein at least one checkbox relates to a printer reconfiguration on the client computer based on a presence of a printer coupled to a network.

21. One or more computer-readable media storage storing information for enabling a client device to perform a method, the method comprising:

at the client device, via a network, receiving a message from a server device, the message containing an indication of a server configuration change that affects the client's interoperation with the server device;

at the client device, receiving user interaction with the message to invoke a wizard that uses the indication of the server configuration change to automatically identify a client configuration change that is called for by the server configuration change; and at the client device, displaying a mechanism to allow a user to control whether to apply the client configuration change that is called for the server configuration change, and in response to user input, automatically making the client configuration change on the client.

* * * * *